(12) United States Patent
Cabané et al.

(10) Patent No.: US 6,383,027 B2
(45) Date of Patent: May 7, 2002

(54) MICROCIRCUIT CARD CONNECTOR AND PROCESS FOR INSTALLING THE CARD IN SUCH CONNECTOR

(75) Inventors: Francis Cabané, Dole; Olivier Cailler; Gabriel Camacho, both of Pontarlier, all of (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/746,471

(22) Filed: Dec. 21, 2000

(30) Foreign Application Priority Data

Dec. 22, 1999 (FR) .............................. 99 16218

(51) Int. Cl.[7] ........................ H01R 24/00; H01R 13/62; H01R 13/15
(52) U.S. Cl. ...................... 439/630; 439/331; 439/260
(58) Field of Search ...................... 439/630, 60, 331, 439/260, 326

(56) References Cited

U.S. PATENT DOCUMENTS

| 3,701,071 A | 10/1972 | Landman ...................... 339/4 |
| 5,257,414 A | 10/1993 | Trahan et al. ................. 455/90 |
| 5,320,552 A | 6/1994 | Reichardt et al. ........... 439/331 |
| 5,813,878 A | * 9/1998 | Kuwata et al. ............. 439/326 |
| 5,944,549 A | 8/1999 | Po et al. ...................... 439/326 |
| 5,984,707 A | * 11/1999 | Kuwata ....................... 439/326 |
| 6,024,593 A | * 2/2000 | Hyland ........................ 439/326 |
| 6,095,868 A | * 8/2000 | Hyland et al. .............. 439/630 |
| 6,174,186 B1 | * 1/2001 | Hashiguchi et al. ........ 439/260 |
| 6,174,188 B1 | * 1/2001 | Martucci .................... 439/326 |
| 6,193,557 B1 | * 2/2001 | Luvini et al. ............... 439/630 |
| 6,210,193 B1 | * 4/2001 | Ito et al. ..................... 439/326 |
| 6,220,882 B1 | * 4/2001 | Simmel et al. ............. 439/326 |
| 6,238,226 B1 | * 5/2001 | Schempp et al. .......... 439/260 |

FOREIGN PATENT DOCUMENTS

| EP | 0515897 B1 | 12/1992 |
| EP | 0520080 A1 | 12/1992 |

* cited by examiner

*Primary Examiner*—P. Austin Bradley
*Assistant Examiner*—Edwin A. León
(74) *Attorney, Agent, or Firm*—Perman & Green, LLP

(57) ABSTRACT

A connector (1) for receiving a microcircuit card, the connector having a resilient arm (9) on a first border (10) of the seat (2) of the connector. The arm is curved inwardly towards the seat to exert pressure on an edge of the card in the direction of a second border (11) of the seat, opposite the first border. It allows to limit a longitudinal mobility of the card in its seat. Further, the connector also has releases (14, 15, 19, 31, 36) on an upper portion of its housing to cover an upper portion of the card, in order to prevent a vertical mobility of the seated card.

11 Claims, 3 Drawing Sheets

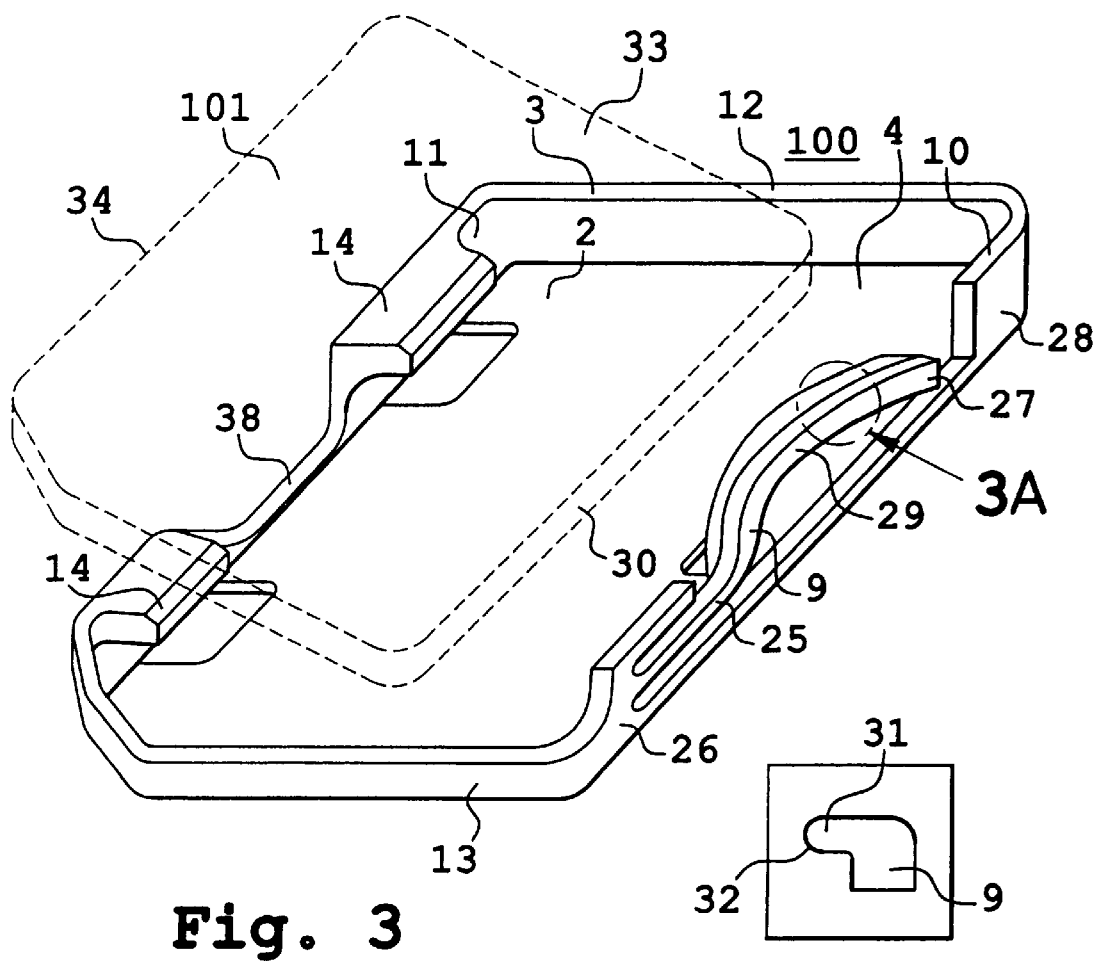
Fig. 3
Fig. 3A
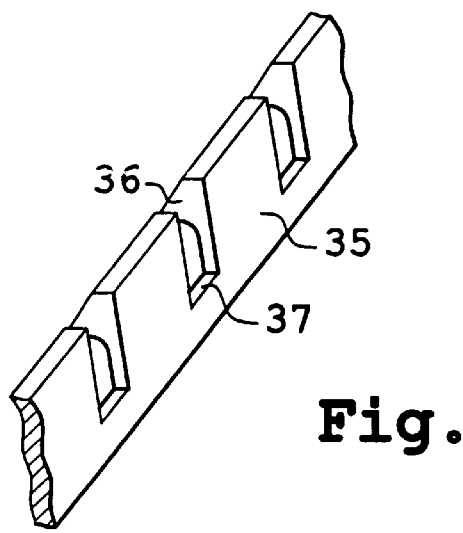
Fig. 4

MICROCIRCUIT CARD CONNECTOR AND PROCESS FOR INSTALLING THE CARD IN SUCH CONNECTOR

FIELD OF THE INVENTION

The present invention relates to a microcircuit card connector. It also relates to a process for installing the card in such a connector. More particularly it finds use in the field of chip card connectors, especially in the field of electronic minicard connectors. These connectors are generally designed to be installed in electronic apparatuses of small size and volume, typically in "pocket" apparatuses, such as portable radiotelephones. In prior art, connectors are known for receiving such microcircuit cards, such that a connector has both means for retaining the card in a connector space, and means for holding the card against the contacts of this connector. The interest of the invention lies in that it provides a connector having a simple means to retain the card in the connector in a position in which it is connected with the connector contacts.

BACKGROUND OF THE INVENTION

In prior art, a connector is particularly known from the principle of document U.S. Pat. No. 5,320,552, which has a housing that forms a seat for a microcircuit card and has contacts at the bottom of this seat to come in contact with conductive segments of the microcircuit. The seat of this connector has a shape which is complementary to a volume defined by the card to be inserted in this connector. Hence, the distances between the borders of the seat are adjusted to correspond to the card size. In order to assure the quality of contact between the conductive segments of the microcircuit and the connector contacts, this connector has a cover. According to this document, the cover may be pivoted between an open and a closed position. In the closed position, a lower face of the cover abuts against the microcircuit card in such a manner as to press the conductive segments of the latter against the contacts of the connector. As a result, the cover prevents any vertical mobility of the card in its seat.

The microcircuit card is held in this connector by a first border set and by a second border set, the second border set being orthogonal to the first border set. These borders allow to delimit the seat. They prevent any longitudinal and lateral mobility of the card in the seat of the connector. Nevertheless, to this end, the seat size must be perfectly adjusted to fit the size of a card to be inserted, which is not easily obtained.

Such prior art connector involves a problem. Its structure is complex due to the use of a pivoting cover and, in addition, the connector is bulky due to the added thickness of the cover.

An additional shortcoming of such a type of connector is related to the fragility of its structure. In fact, in such a connector, the cover is attached to the housing by means of a mechanical joint. Since this mechanical joint is miniature-sized, it is fragile.

Also, a prior art microcircuit card connector is known from the principle of document EP-A-0 515 897. This connector also has a housing with a card seat. The seat is provided in such a manner that contacts are provided over a bottom of this seat to contact the conductive segments of the microcircuit. In order to retain the card in its seat, the housing has on a first side a groove to receive a first edge of the card and, on a second side, opposite to the first side, a tip. The tip is rotationally flexible. When a first edge of the card is locked in the groove, and the card is pushed down into the seat, a second edge of the card abuts against this chamfered tip. Then the flexible tip is slightly pushed inwardly towards the seat, which is partially undercut in that area, to allow the passage of the card and properly position it in its seat.

Further, the card is held vertically in its seat by releases of the groove and by the presence of the tip cooperating with a resilient lever which is provided on the lower face of the housing. Conversely, the longitudinal and lateral mobility of the card inside the seat is only assured by the fixed borders of the seat. As a result, in order to prevent any movement of the card inside its seat, the size of said seat must be strictly complementary, any clearance being accounted for, to the card shape.

Such type of prior art connector also has a problem. The card-receiving structure of the housing is fragile. The housing uses two flexible means, the tip on the one hand and the resilient lever on the other. Now, in order to properly insert a card in this connector, a strong pressure force must be exerted on the flexible tip. Also, in order to remove a microcircuit card inserted in such connector, the lock generated by the flexible tip must be released. To this end, a rotary force must be exerted on the axle about which said tip rotates. This axle is fragile, because it is attached to the edges of the housing by thin structures. In fact, these structures are specially designed to be thin to allow these rotary movements. Hence, there is the risk of rupturing these thin structures, thereby making the connector useless.

Also, an intrinsic variability of chip card sizes exists and is associated to production processes. Hence, a wider seat must be provided to accept the maximum number of cards. However, in this case the card is positioned in an insecure manner in its seat, and may even float therein.

SUMMARY OF THE INVENTION

The present invention has the object to solve both size and fragility problems of prior art connectors and variability problems, by providing a connector having a flexible member which causes a translation of the card in a seat of a housing of the connector, to retain said card in a fixed position in the seat. Therefore, the invention provides a housing such that on one side of the seat, a fixed border of the housing has overhanging releases to cover a first portion of a top surface of the card to be inserted in the seat. Also, on a second side, preferably opposite said first side, the housing has a flexible arm, situated within the dimensions of a frame formed by the housing. This arm is only fastened at one point of the border. The flexible arm has a free end which snaps inwardly towards the seat by elastic translation, parallel to the card plane, in such a manner as to force a card seated therein against the first border.

On the other hand, this flexible arm also has an upper release to additionally cover a portion of the upper face of the card. Such a connector generally has contacts over its bottom to provide contact with the conductive segments situated on the microcircuit card. In fact, such type of connector is specially conceived to receive microcircuit minicards.

In order to insert a microcircuit card in a connector according to the invention, a first edge of the card must be placed beneath the releases of the flexible arm. Then, pressure is applied on the card, which is disposed obliquely with respect to the seat bottom, to displace the card parallel to said bottom, and to deform the free end of the flexible arm. The flexible arm moves back until the first edge comes in contact with the borders situated level with the arm. Then, a second edge of the card, said second edge being opposite the first edge, is pushed down. When said second edge is pushed down into the seat, the card abuts against the contacts contained at the bottom of the seat. Once the card is parallel to the seat bottom, the pressure against the resilient arm is released, to let the card abut, under the effect of the pressure exerted by the resilient arm, against the first border of the housing. Then, the releases provided on this first border of the housing overhang a portion of the card.

Therefore, the card is held vertically by a cooperation between the seat bottom and the releases provided on each of the borders. Also, this card is held longitudinally by means of the resilient arm which forces the card against the second border of the housing. According to the invention, a lateral mobility of the card inside the housing has no adverse effect until such a connector may be provided whose size is finely adjusted according to the lateral orientation of the card. Alternatively, such a connector may be provided that the contacts provided over the seat bottom may abut against the most important segments of a microcircuit situated on a card to be inserted in this seat.

Therefore, the invention relates to a microcircuit card connector having a housing with a card seat and contact blades intended to come in contact with the conductive segments of the microcircuit, said blades being provided over a bottom of the housing against which the card is placed, characterized in that the housing includes a first border having an arm which is aligned with said border and is flexible to hold the card against a second border of the housing, said second border being opposite the first border, the flexible arm having at least one free end which elastically snaps towards the second border when the card is seated, to let the latter come to abutment in a predetermined position.

The invention also relates to a process for installing a microcircuit card in a connector, characterized in that it includes the following steps:

placing a first edge of the card against a first flexible border of a connector housing, so that the card forms an acute angle with a plane of a housing bottom;

pushing down a second edge of the card, said second edge being opposite the first edge, by deforming the flexible border thanks to a pressure exerted on the first edge;

placing the card parallel to the bottom;

releasing the pressure exerted on the flexible border to place a portion of an upper face of the card beneath a release of a second border.

BRIEF DESCRIPTION OF THE DRAWINGS

The invention will be understood more clearly by reading the following description with reference to the accompanying figures. The latter are only shown by way of example and do not intend to limit the invention in any manner. The figures show:

FIG. 3: a top perspective view of a second embodiment of a connector according to the invention;

FIG. 4: a top perspective view of a variant of the connector according to the invention;

DETAILED DESCRIPTION OF THE INVENTION

Figure 1:
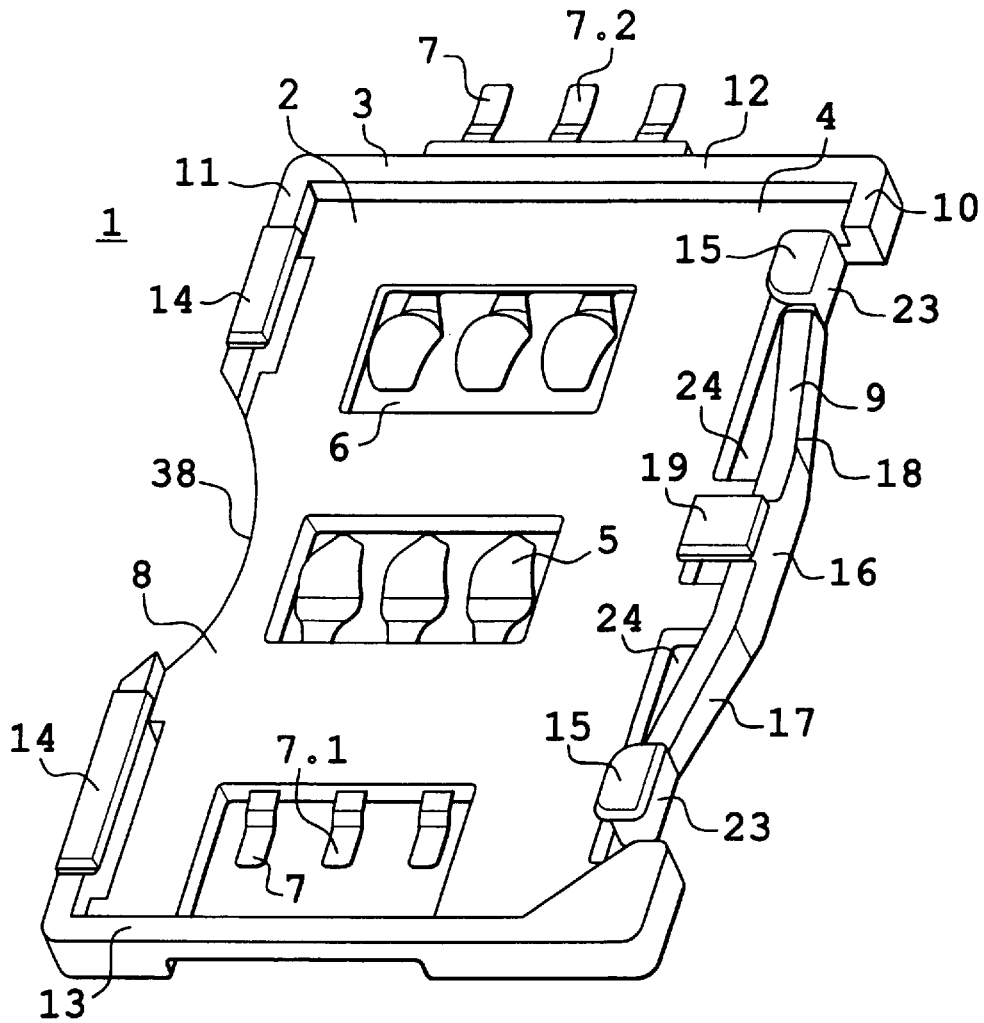
FIG. 1: a top perspective view of a first embodiment of a connector according to the invention.
Figure 2:
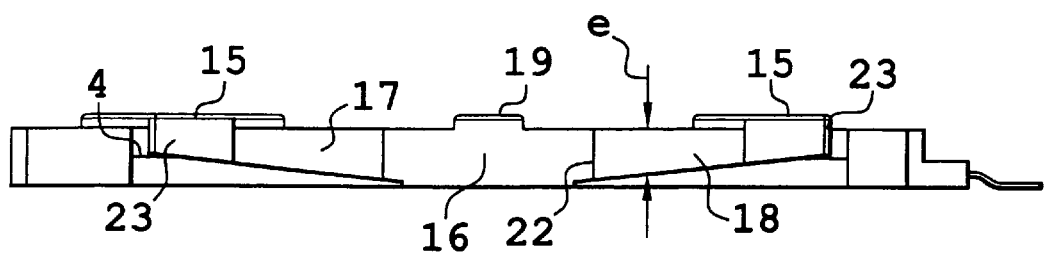
FIG. 2: a sectional view of the first embodiment of the connector according to the invention.

FIG. 1 shows a connector 1 according to the invention. The connector 1 is designed to receive a microcircuit card (not shown) in a seat 2 of a housing 3. The housing 3 particularly includes a bottom 4 whereat contacts 5 are provided, which are to come in contact with conductive segments of a microcircuit situated on a card which can be inserted in the seat 2.

In a preferred embodiment of the invention, the contacts 5 are metal resilient blades which may be, for instance, molded inside the housing 3. In this embodiment, as shown in FIG. 1, the housing 3 includes a bottom 4 having an aperture 6 wherefrom the active conductive portions of these contact blades 5 appear. In this embodiment, the contact blades 5 are preferably provided level with the bottom 4. Also, the contact blades 5 have contact tabs 7 to be welded, for instance, on a printed board. These contact tabs 7 may be provided in the space delimited by the frame of the housing 3, as in the case of contact blades 7.1 which are provided in an aperture like the aperture 6. However, they may be also provided at a peripheral side of the frame of the housing 3, as in the case of the contact tabs 7.2.

The connector 1 has an resilient arm 9, such that said resilient arm 9 is included in a frame delimited by the borders of the housing 3. In fact, the housing 3 particularly has a first border 10 such that said first border 10 defines a plane which does not extend beyond the resilient arm 9. In one embodiment, as shown in FIG. 1, the resilient arm 9 is inwardly curved towards the seat 2. Therefore, the resilient arm 9 may be pushed from this position in which it is inwardly curved towards the seat 2, to a second position in which it is partly aligned with the border 10.

The housing 3 has a second border 11, such that this second border 11 is opposite the first border 10. The second border 11 is fixed. It is also rigid. The housing 3 further includes a third border 12 and a fourth border 13. The borders 12 and 13 are preferably perpendicular to the borders 10 and 11, which are parallel to each other. The frame defined by the housing 3 has a generally rectangular shape. Hence, the seat 2 is defined by the bottom 4 and the borders 10, 11, 12, and 13. A microcircuit card inserted in such a seat 2 is laterally held between the borders 12 and 13. Also, the card is longitudinally retained between the borders 10 and 11 thanks to a flexible arm 9. Retention is ensured by the borders 10 and 11, whereas the flexible arm 9 allows to hold cards having slight width variations.

Moreover, in order to ensure the retention of the card in the seat 2 in the thickness direction, the border 11 has a release 14 disposed on an upper portion of the border 11, which is chamfered at its top to assist the sliding movement of the card and to pass above a top face of a card inserted in the seat 2. Similarly, the resilient arm 9 has a release 15 to cover the upper face of the card inserted in said seat 2. The release 15 is similar to the release 14. Hence, the releases 14 and 15, in conjunction with the bottom 4, allow to limit the vertical mobility of the card inside the seat 2.

A first embodiment of a connector 1 according to the invention, as shown in FIG. 1 comprises an resilient arm 9 such that the resilient arm 9 is retained by a foot 16 of the bottom 4. Here the foot 16 is centered with respect to the arm 9. The arm 9 is composed of two flexible tongues 17 and 18 on both sides of the foot 16. The foot 16 is such that it is aligned with the border 10. Further, the flexible tongues 17 and 18 are such that each has an inwardly curved end, on both sides of the foot 16 directed towards the cavity 4. Hence, the structure formed by the arm 9 is shaped as a circle arc.

In accordance with this first embodiment, in order to vertically retain a card abutting against the resilient arm 9, the foot 16, as well as the flexible tongues 17 and 18 have upper releases. In fact, the foot 16 has an upper release 19 and the flexible tongues 17 and 18 of the arm 9 have each a release 15 at their free end. The releases 15 and 19 are disposed at the same height with respect to the bottom 4 of the seat 2. A height between a lower face of each of these releases 15 and 19 and the bottom 4 is of the same order as the thickness of a microcircuit card to be inserted in the housing 2, all functional clearances being accounted for, or slightly smaller.

The flexible tongues 17 and 18 have a particular shape. In fact both tongues 17 and 18 have such a thickness that said thickness decreases progressively from a fastening point with the foot 16. For example, in the case of the resilient tongue 18, the thickness of an end 22 of the tongue 18 situated at the junction with the foot 16 is greater than the thickness at the end 23 of the tongue 18. As a result, when pressure is exerted, for instance, by an edge of a card forced against the end 23 of the resilient tongue 18, said pressure is distributed evenly over the resilient tongue 18, and not only at the attachment point 22. On the other hand, as shown in FIG. 1, the bottom is slightly undercut at an area whereat the flexible tongues 17 and 18 snap.

FIG. 3 shows a second embodiment of a connector 100 according to the invention. The structure of this connector 100 being similar as a whole to the one of the connector 1, common parts will be denoted by the same numerals. In FIG. 3, the connector 100 is shown with a card 101 designed to be received in the seat 2 of the connector 100. The connector 100 has a flexible and resilient arm 9 such that this arm 9 is joined by one end thereof 25 to a portion 26 of the border 10. Also, this resilient arm 9 has a free end 27 such that this end 27 is independent and free and faces a second portion 28 of the border 10. Assuming that the resilient arm 9 does not extend beyond a plane formed by the border 10, only the ends 25 and 27 belong to the plane formed by the border 10. The resilient arm 9 has a curved shape such that the curve it forms is oriented inwardly towards the seat 2. A curve center 29 of the arm 9 is preferably disposed at a median area, between the portions 26 and 28 of the border 10. Hence, the curve area 29 may exert a maximum pressure over a median area of a first edge 30 of the card 101. Further, when the card 101 is inserted obliquely in the connector 100, the edge 30 abuts against the resilient arm 9 and more particularly first against the curve area 29. The exertion of this pressure force results in that the resilient arm 9 is immediately pushed away from the plane formed by the border 10.

The resilient arm 9 has an upper release 31 like the releases 15 and 19 as shown in FIG. 1. More precisely, the release 31 has a chamfer 32 to receive and abut against an upper face 33 of the card 101. When the edge 30, pushing against the curve area 29, abuts against the border 10, then the second edge 34 of the card 101 is pushed down towards the bottom 4 of the seat. Then, the pressure exerted on the curve area 29 is released so that the card 101 is allowed to abut against the border 11, and the releases like the release 14 of this border 11 overhang the upper face 33.

In a variant embodiment, it may be arranged that the resilient arm 9 consists of a strip 35 contained between the ends of the portions 26 and 28, as shown in FIG. 3. Then, in this variant embodiment, as shown in FIG. 4, resilient portions with releases 36 will be provided by delimiting separate sectors of the strip 35 by means of slits 37. The strip 35 also has releases 36 for retention of the upper face of a card inserted in the seat. In this embodiment, the strip 35 has slits 37 to assist the straightening of the curve of this strip under the effect of a pressure exerted by a card edge. Then the slits 37 are arranged vertically, such that these slits 37 are generally orthogonal to the plane formed by the bottom 4.

Further, the housing 3 preferably has a notch 38. This notch 38, which may be cut, for instance, in the border 11 and/or in the bottom 4 of the seat 2 allows for easy handling of the card to be inserted in the seat 2 upon insertion and particularly upon removal thereof. In fact, this notch allows the passage of a finger for exerting pressure on the edge of the card.

When a microcircuit card is to be installed in such a connector, a first edge 30 is first pushed against the flexible arm 9 so that the flexible arm 9 moves back and until the edge 30 abuts against the border 10 of the connector. It is understood that, in order to perform this operation, the card has to be preferably disposed obliquely with respect to a plane formed by the bottom 4 of the connector. In fact, the edge 30 is disposed against the flexible arm 9 but abuts against the bottom 4 as well. Finally, when the edge 30 abuts against the border 10, a second edge 34 is pushed down against the bottom 4 so that the card is forced against the bottom 4 of the seat 2. The second edge 34 is preferably opposite the first edge 30. While the second edge is pushed down, the pressure exerted on the resilient arm 9 is maintained. Then, once the card is fully pressed against the bottom 4 of the seat 2, the pressure exerted by the edge 30 on the resilient arm 9 is preferably released from the notch area 38, so that the resilient arm 9 exerts an elastic pressure against the edge 30 to push the edge 34 of the card against the border 11, the card being removable by performing the same steps in the reverse direction. Further, assuming that the border 11 has a release 14, this release 14 overhangs the upper face 33 of the card.

Figure 5:
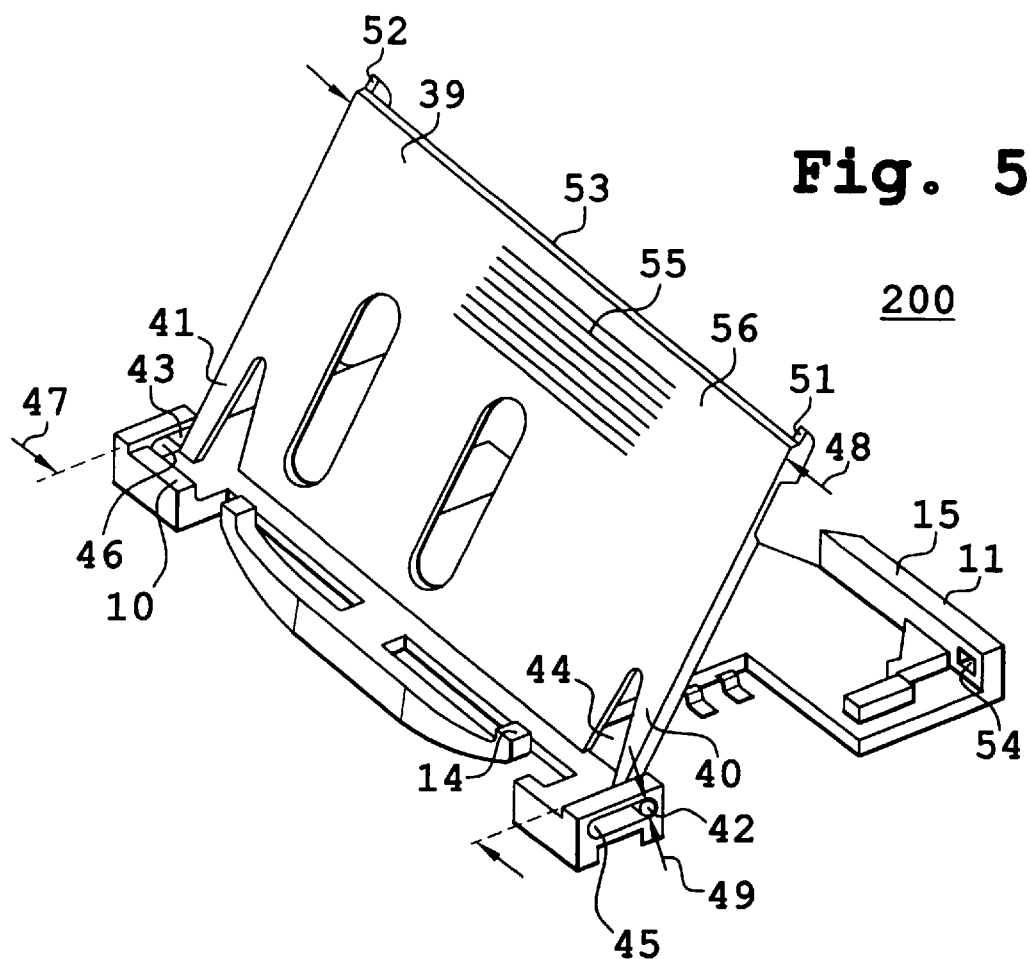
FIG. 5: a top perspective view of a third embodiment of a connector according to the invention.

FIG. 5 shows a third embodiment of a connector 200 according to the invention. The structure of this connector 200 being similar as a whole to the one of the connector 1, common parts will be denoted by the same numerals. In FIG. 5, the connector 200 is designed to have a cover 39 to retain a card to be inserted in the seat 2 of the connector 100. The connector 200 has a flexible and resilient arm 9 like the one of FIG. 1.

The cover 39 is a flat plate such that it has two flexible tabs 40 and 41, each provided at its end with a pivot 42 and 43 respectively. The tabs 40 and 41 are parallel to each other. They are flexible, because the cover has a slit at each tab. For example, the tab 40 is defined within the frame of a rectangle formed by the cover 39, but it is flexible because the cover 39 has the slit 44, which also allows this tab 40 to be formed.

The pivots, or extensions, 42 and 43 are located in the apertures of the housing. In one embodiment, the extensions 42 and 43 have a cylindrical shape and are mounted perpendicular to an edge of the tab whereto they belong. Particularly, the extension 42 is retained in the aperture 45 and the extension 43 is retained in the aperture 46. In this embodiment, the apertures 45 and 46 are situated on both sides of the first border 10. A distance 47 between the apertures 45 and 46 is such that it is approximately equal to a width 48 of the cover 39. Assuming that the pivots 42 and 43 extend on both sides beyond this width 48, the cover 39 is mounted in the housing 3 by drawing the two resilient tabs closer so that each pivot may be situated before its aperture. Then the two resilient tabs are released and the pivots engage in their respective apertures.

A further advantageous arrangement of this system consists in using chamfers disposed on the releases 14 to allow the cover 39 to be clipped in position.

Figure 6:
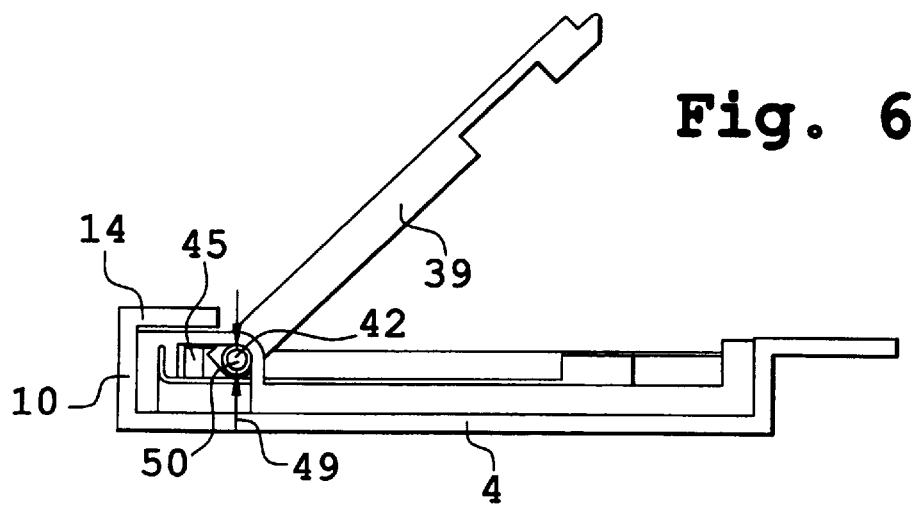
FIG. 6: a sectional view of the third embodiment of the connector according to the invention.

The aperture 45 is preferably wider than a diameter 49 of a pivot like the pivot 42. The same applies to the aperture 46, whose shape is identical to the one of the aperture 45. As is shown in FIG. 6, the cover 39 has an axis of rotation 50 such that this axis of rotation 50 passes through the extensions 42 and 43. Further, the axis of rotation 50 may be translated parallel to the bottom 4 of the seat 2 and parallel to the first border 10, when the aperture is elongated. This translatory motion allows the introduction or the removal of the lugs 51 and 52 provided on a front edge 53 of the cover 39 in the receptacles 54 of the second border 11, said receptacles 54 being coincident therewith. The principle disclosed herein for cover rotation may be reverted, with receptacles being provided in the cover and lugs on the edge in coincidence with the receptacles.

The pivots 42 and 43 and the lugs 51 and 52 allow to keep the cover 39 in a fixed position, further allowing the retention of a card in the seat 2. This variant embodiment of the invention with a cover allows to ensure the perfect flatness of the card in the seat, particularly under varying temperature conditions which may affect the rigidity of the card. For instance, as temperature rises, such a card may become softer and its surface may be curved. In fact, the contacts exert a pressure force against the card which, as it softens under the effect of rising temperature, tends to sag, which involves an increase of contact resistances. When the card becomes softer under the effect of this pressure, it sags and is no longer in contact with the contacts 5 situated on the bottom 4 of the seat 2. The cover 39 allows to prevent curving of the card, and ensures perfect flatness and preserved contact of the card against the contacts 5.

In a preferred embodiment, the cover 39 has flutes 55 on an upper face 56 to assist the translation of the cover parallel to the bottom 4.

The cover 39 provides no added thickness if, when it is snapped in position, the upper face 56 is aligned with the upper faces of the releases 14 and 15 of the first and second borders 10 and 11.

What is claimed is:

1. A microcircuit card connector having a housing with a card seat and contact blades intended to come in contact with conductive segments of the microcircuit, the blades being provided over a bottom of the housing against which a card is placed, wherein the housing includes a first border having an arm which is aligned with the first border, thearm being flexible to hold the card against a second border of the housing, the second border being opposite the first border, the flexible arm having at least one free end which elastically snaps towards the second border when the card is seated, thereby allowing the card to come to abutment in a predetermined position, further wherein the flexible arm is attached to a seat bottom by a foot which is centered on the arm and has two flexible tongues positioned on both sides of the foot, the foot and the two flexible tongues having releases to cover a portion of the upper surface of the card.

2. A connector as claimed in claim 1, wherein said flexible arm is attached to said first border by one end only.

3. A connector as claimed in claim 1, wherein said tongues have a thickness which decreases from a foot fastening point to an end of said tongue.

4. A connector as claimed in claim 1, wherein said flexible arm forms said first border and includes a long strip with vertical slits so that an inwardly curved strip, directed towards the seat of said housing is provided.

5. A connector as claimed in claim 1, wherein said flexible arm has a chamfered release to cover a portion of said upper surface of said card.

6. A connector as claimed in claim 1, wherein said housing has a notch on the side of said second border.

7. A connector as claimed in claim 1, wherein said borders have releases which cover portions of said upper surface of said card.

8. A connector as claimed in claim 1, wherein said first border is flexible in order to receive an edge of said housing.

9. A connector as claimed in claim 1, wherein said housing has a movable cover, whereby an axis of rotation of the cover is parallel and close to said first border.

10. A connector as claimed in claim 9, wherein said cover is retained in said housing by extensions locked in apertures of said housing borders.

11. A connector as claimed in claim 9, wherein said cover has receptacles for retaining lugs of a housing border.

* * * * *